United States Patent [19] | [11] Patent Number: 5,030,758
Dietrich et al. | [45] Date of Patent: Jul. 9, 1991

[54] POLYETHER POLYOLS BASED ON O-TOLYLENEDIAMINE, A PROCESS FOR THEIR PRODUCTION, AND THEIR USE FOR POLYURETHANE AND POLYISOCYANURATE PLASTICS

[75] Inventors: Manfred Dietrich; Reinhard Kaufung, both of Leverkusen, Fed. Rep. of Germany

[73] Assignee: Bayer Aktiengesellschaft, Leverkusen, Fed. Rep. of Germany

[21] Appl. No.: 277,165

[22] Filed: Nov. 29, 1988

[30] Foreign Application Priority Data

Dec. 1, 1987 [DE] Fed. Rep. of Germany ....... 3740634

[51] Int. Cl.[5] .............................................. C07C 217/28
[52] U.S. Cl. ...................................... 564/399; 564/443
[58] Field of Search ................................ 564/443, 399

[56] References Cited

U.S. PATENT DOCUMENTS

| | | | |
|---|---|---|---|
| 3,462,492 | 8/1969 | Kobar et al. | 564/399 X |
| 4,209,609 | 6/1980 | Haas | 528/421 |
| 4,243,759 | 1/1981 | Haas | 521/167 |
| 4,391,728 | 7/1983 | Korczak et al. | 252/182 |
| 4,562,290 | 12/1985 | Korczak et al. | 564/399 |
| 4,767,795 | 8/1988 | Adam et al. | 521/99 |

FOREIGN PATENT DOCUMENTS

| | | | |
|---|---|---|---|
| 57-168917 | 10/1982 | Japan | 564/443 |
| 57-168919 | 10/1982 | Japan | 564/443 |
| 972772 | 10/1964 | United Kingdom . | |
| 1311095 | 3/1973 | United Kingdom . | |

*Primary Examiner*—Richard L. Raymond
*Attorney, Agent, or Firm*—Joseph C. Gil; Richard E. L. Henderson; Godfried R. Akorli

[57] ABSTRACT

This invention relates to o-tolylenediamine-based polyether polyols having an OH number of about 400 to 630, in which about 5 to 20% of the isocyanate-reactive groups of the polyether polyols are secondary amino groups and which contain less than about 0.2% by weight free o-tolylenediamine. The polyether polyols of the invention are formed by sequential reaction of o-tolylenediamine first with about 2 to 5 mol of ethylene oxide and then with about 1 to 5 mol of propylene oxide per mol of o-tolylenediamine. This invention also relates to the process for the production of polyether polyols using said sequential reaction at a temperature of about 90° to 125° C. and in the presence of an amine catalyst. This invention further relates to a method for the production of polyisocyanate-based plastics, preferably polyurethane foams, comprising reacting organic polyisocyanates with polyether polyols of the invention and compounds containing at least two isocyanate-reactive hydrogen atoms and having a molecular weight range of about 200 to 1,500, and optionally also with chain-extending agents or crosslinking agents and auxiliaries or additives.

10 Claims, No Drawings

POLYETHER POLYOLS BASED ON O-TOLYLENEDIAMINE, A PROCESS FOR THEIR PRODUCTION, AND THEIR USE FOR POLYURETHANE AND POLYISOCYANURATE PLASTICS

BACKGROUND OF THE INVENTION

This invention relates to improved basic polyether polyols, to a process for their production, and to their use for the production of polyurethane and polyisocyanurate plastics.

Alkylene oxide adducts of tolylenediamines ("TDA"), more especially 2,4- and 2,6-TDA and mixtures thereof, and their use for the production of polyurethanes have long been known. E.g., British Patent 972,772. DE-OS 2,017,038 also describes polyethers based on o-TDA (a mixture of 2,3- and 3,4-TDA) and their use for the production of polyurethanes. In these polyethers, all the aminic protons of the o-TDA react with epoxides.

TDA is produced in large quantities as starting material for the production of tolylene diisocyanate ("TDI"). Crude TDA, which contains small amounts of o-TDA in addition to the 2,4- and 2,6-isomers, is readily available and is thus attractive as a starting material for rigid-foam polyethers. For some years, it has been standard practice in the production of TDA to purify the crude TDA by distillation, with o-TDA accumulating as secondary product. This inexpensive by-product is now increasingly being used as a starter for basic polyethers.

Work in the area has intensified in the last 10 years, following reports (U.S. Pat. No. 4,209,609, believed to be equivalent to EP-A 01,800) that rigid polyurethane foams based on certain TDA polyethers show some major advantages over conventional rigid polyurethane foams. Such TDA polyethers have OH values in the range of 400 to 630 and are produced by sequential reaction of TDA with approximately 4 mol (per mol of TDA) of ethylene oxide and then propylene oxide. That is, in addition to a high OH value and a minimum ethylene oxide content, all the terminal groups must be secondary. The advantages include, in particular, an extremely low co-efficient of thermal conductivity, favorable flame resistance, and good toughness.

Pure propylene oxide polyethers produced by conventional methods show extremely high viscosities (>50,000 mPa.s at 25° C.) in the OH-value range mentioned and give rigid foams with only the usual properties. Relatively low-viscosity, pure propylene oxide polyethers of the type produced in accordance with U.S. Pat. No. 4,391,728 (i.e., at high temperatures in the presence of at least 0.8% alkali metal hydroxide) suffer similar disadvantages. Moreover, pure ethylene oxide polyethers, because of their primary OH groups, are too active for most rigid-foam applications.

Polyethers which satisfy the requirements already mentioned, namely approximately 4 mol per mol TDA of ethylene oxide and then propylene oxide, are described in U.S. Pat. No. 4,209,609. According to this patent, the alkoxylation catalyst is preferably added after the ethylene oxide stage. If, however, one of the disclosed amine catalysts, such as triethylamine or pyridine (see Comparison Examples c and h in Table 1), is added before the ethylene oxide, the products obtained are of extremely high viscosity and contain only tertiary amino groups. Where potassium hydroxide is used directly (Comparison Example d in Table 1), the products, although of low viscosity, are not reproducibly obtained (as observed in DE-OS 2,017,038, page 5, line 17) and in addition show a very high content of free o-TDA (1 to 2% by weight).

A two-step process for the production of low-viscosity polyethers based on o-TDA in the OH-value range of 300 to 500 is described in U.S. Pat. No. 4,562,290. In the first step of this process, 1 to 3 mol ethylene oxide per mol o-TDA is added at 125° C. and, in the second step, propylene oxide is added (following addition of potassium hydroxide as catalyst) at a temperature of at least 140° C.

The polyethers based on o-TDA obtainable in accordance with U.S. Pat. No. 4,209,609 are of only limited use. In particular, rigid-foam panels more than 10 cm thick, which are produced in conventional laminator machines, cannot be made with these materials. However, such panels are increasingly being stipulated in the building regulations of many countries. Although, as mentioned above, foams having low coefficients of thermal conductivity, good flame resistance values and toughness values combined with good flow behavior can be obtained using the method of U.S. Pat. No. 4,209,609, such foams show a marked tendency towards cracking and core discoloration, particularly in large layer thicknesses.

It has now surprisingly been found that TDA polyethers showing outstanding foaming properties without the disadvantages mentioned above, namely cracking and core discoloration, can be used to produce foam in thick layers. These TDA polyethers provide the desired property improvements with regard to high flame resistance, good toughness and, in particular, an even further reduced coefficient of thermal conductivity in relation to the prior art. According to the present invention, only o-TDA is used and the sequential alkoxylation with ethylene oxide and then with propylene oxide is carried out from the outset in the presence of special amine catalysts described in detail hereinafter.

SUMMARY OF THE INVENTION

The present invention relates to o-tolylenediamine-based polyether polyols having an OH number of about 400 to 630 wherein about 5 to 20% of the isocyanate-reactive groups are secondary amino groups and the free o-tolylenediamine content is below about 0.2% by weight. The polyether polyols of the invention are obtained by sequential reaction of, first, about 2 to 5 mol (preferably 3.1 to 4 mol) ethylene oxide and then about 1 to 5 mol (preferably 1 to 4.1 mol) propylene oxide with 1 mol o-tolylenediamine.

The present invention also relates to a process for the production of the polyether polyols of the invention, wherein o-tolylenediamine is reacted at temperatures of about 90 to 125° C. first with about 2 to 5 mol (preferably 3.1 to 4 mol) ethylene oxide in the presence of 0.05 to 1% by weight of an amine catalyst. Such catalysts may be a standard commercial amine polyurethane foam catalyst and/or of an amine selected from the group comprising N-methylimidazole, benzyltrimethylammonium hydroxide and homologs, and 2-di($C_1$-$C_4$ alkyl)aminoethanol. The second step involves adding about 1 to 5 mol (preferably 1 to 4.1 mol) propylene oxide, such that the total quantity of alkylene oxide is about 5.0 to 8.1 mol per mol o-tolylenediamine.

The present invention further relates to a process for the production of polyurethane ("PU") plastics, preferably PU foams, including polyisocyanurate foams, which, in particular, show flame-resistant properties. In this process, the polyethers according to the invention based on o-TDA, optionally with inclusion of other polyether or polyester polyols and incorporable or non-incorporable flame retardants, are used in the conventional production of PU foams by the polyisocyanate polyaddition process.

DETAILED DESCRIPTION OF THE INVENTION

In the production process according to the invention for producing polyether polyols, a considerable proportion of the amino groups (10 to 40 mol-%) is only monoalkoxylated, so that 5 to 20% of the isocyanate-reactive groups remain behind in the end product as secondary amino groups. This characteristic explains the reduction in viscosity compared with previously reported products in which all the amino groups are fully alkoxylated. The content of secondary amino groups in the polyethers according to the invention may be determined from the difference in the OH values determined by the acetic anhydride or phthalic anhydride method. As model tests have shown, the total number of OH and NH groups is determined in the acetic anhydride method while, in the phthalic anhydride method, only the OH groups are acylated.

Another consequence of the presence of secondary amino groups is the reduction in the content of tertiary amino groups which catalyze secondary reactions at high foam temperatures. Such secondary reactions occur during foaming either to large layer thicknesses or to high gross densities and cause cracking and core discoloration.

The polyethers according to the invention surprisingly contain less than 0.2%, and in most cases even less than 0.1%, free o-TDA, despite only partial alkoxylation of the amino groups.

Further advantages of the process according to the invention include (1) the elimination of a neutralization step and the elimination of alkali salts and (2) by virtue of the relatively low reaction temperatures, avoidance of secondary reactions involving epoxides (such as formation of aldehydes, dioxanes, and dioxolanes) and, hence, avoidance of emission problems and ultimately discoloration.

Another advantage of the polyethers according to the invention is the increase in the initial activity of the foam mixture due to the reactive secondary amino groups present, which enables savings of catalyst.

It is, of course, also possible in the production of the o-TDA-based polyethers according to the invention to use up to 50 mol-% of co-initiators, such as glycerol, trimethylolpropane, pentaerythritol, sorbitol, sucrose, and also diols, such as ethylene glycol, diethylene glycol and propylene glycol, as well as ammonia, aliphatic amines and alkanolamines.

The process of the invention is generally carried out as follows:

The o-TDA is initially introduced together with the amine catalyst (0.15 to 4.6% by weight, based on o-TDA). Suitable catalysts include standard commercially available amine polyurethane foam catalysts, such as N,N-dimethylbenzylamine, N,N-dimethylcyclohexylamine, pentamethyl diethylenetriamine, 2,2'-bis dimethylamino)diethyl ether, N-methyl-N'-(dimethylaminoethyl)-piperazine, and amines from the group comprising N-methylimidazole, benzyltrimethylammonium hydroxide and homologs, and 2-dialkylaminoethanol containing $C_1$–$C_4$ alkyl groups. See also DE-OS 2,624,527, DE-OS 2,624,528, DE-OS 2,636,787, DE-OS 1,720,633, U.S. Pat. No. 3,330,782, DE-AS 1,030,558, DE-OS 1,804,361, DE-OS 2,618,280.

Two to five times the molar quantity of ethylene oxide is first added over a period of 2 to 6 hours at 90° to 125° C. After about 2 hours, propylene oxide is added in the quantity required for the desired OH value of 400 to 630. After another 5 hours at 125° C., alkylene oxide can be detected only in traces that are removed in vacuo. No further working-up steps are needed.

The polyether polyols according to the invention are eminently suitable for use as starting materials for polyurethane plastics for which polyhydroxyl compounds having high OH values are normally used, for example, coatings, bonds, duromers, sandwich materials, and so forth. However, the principal application of such polyethers is in rigid polyurethane foams having different polyisocyanurate contents.

In addition to the polyethers according to the invention, the following materials are used in the production of polyurethanes, preferably rigid polyurethane foams:

Suitable materials for the production of polyurethanes include isocyanate-containing compounds such as aliphatic, cycloaliphatic, araliphatic, heterocyclic, and, in particular, aromatic di- or polyisocyanates of the type described, for example, by W. Siefken in *Justus Liebigs Annalen der Chemie,* 562, pages 75 to 136. Such di- or polyisocyanates include, for example, those corresponding to the formula $Q(NCO)_n$, in which n is 2 to 4 (preferably 2) and Q is an aliphatic hydrocarbon radical containing from 2 to 18 (preferably from 6 to 12) carbon atoms, a cycloaliphatic hydrocarbon radical containing from 4 to 20 (preferably from 5 to 11) carbon atoms, an aromatic hydrocarbon radical containing from 6 to 20 (preferably from 6 to 13) carbon atoms, or an araliphatic hydrocarbon radical containing from 8 to 15 preferably from 8 to 13) carbon atoms, for example, the polyisocyanates described in DE-A 2,832,253, pages 10 to 11. It is particularly preferred to use commercially readily obtainable polyisocyanates, for example, 2,4- and/or 2,6-tolylene diisocyanate and mixtures of these isomers ("TDI"); diphenylmethane diisocyanates (4,4'- and/or 2,4'-and/or 2,2'-isomers); polyphenyl-polymethylene polyisocyanates of the type obtained by phosgenation of aniline-formaldehyde condensates ("crude MDI"); and "modified polyisocyanates", i.e., polyisocyanates containing carbodiimide groups, urethane groups, allophanate groups, isocyanurate groups, urea groups and/or biuret groups, and more especially modified polyisocyanates of the type derived from 2,4- and/or 2,6-tolylene diisocyanate and preferably from 4,4'- and/or 2,4'-diphenylmethane diisocyanate. Where difunctional compounds of relatively high molecular weight and, optionally, other difunctional chain-extending agents of low molecular weight are used essentially free from polyfunctional compounds, it is preferred to use modified polyisocyanates having a functionality of more than 2.0 or trifunctional or higher polyisocyanates.

Other suitable optional starting materials for the production of polyurethanes are so-called chain-extending agents or crosslinking agents, that is, compounds containing at least two isocyanate-reactive hydrogen atoms and having a molecular weight of 18 to 399. Such compounds preferably contain hydroxyl groups, amino groups, thiol groups, carboxyl groups, or hydrazide groups, and more preferably contain hydroxyl groups and/or amino groups. Compounds such as these generally contain 2 to 8 (preferably 2 to 4) isocyanate-reactive hydrogen atoms. Examples of such compounds can be found in DE-A 2,832,253, pages 19 to 20, and include water, triethanolamine, ethylene glycol, diethylene glycol, trimethylolpropane, formitol mixtures or glycerol.

Compounds containing at least two isocyanate-reactive hydrogen atoms and having a molecular weight range of about 200 to 1,500 may be used as a co-polyol component of relatively high molecular weight in quantities of up to 90% by weight, based on the polyethers according to the invention. Such compounds are, in particular, polyesters and/or polyethers containing 2 to 8 hydroxyl groups of the type known per se for the production of homogeneous and cellular polyurethanes and described, for example, in DE-A 2,832,253, pages 11 to 18. Preferred polyethers are those obtained by addition of one or more alkylene oxides (ethylene oxide and especially propylene oxide) onto difunctional or polyfunctional "starters" (e.g., propylene glycol, glycerol, sorbitol, formose, sucrose, triethanolamine, trimethylolpropane).

Suitable polyesters containing hydroxyl groups for use in accordance with the invention include, for example, reaction products of polyhydric (preferably dihydric and, optionally, trihydric) alcohols with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted (for example, by halogen atoms) and/or unsaturated. Such carboxylic acids and their derivatives include, for example, succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimerized and trimerized unsaturated fatty acids (optionally in admixture with monomeric unsaturated fatty acids, such as oleic acid), terephthalic acid dimethyl ester and terephthalic acid bis-glycol ester. Suitable polyhydric alcohols include, for example, ethylene glycol, 1,2- and 1,3-propylene glycol, 1,4- and 2,3-butylene glycol, hexane-1,6-diol, octane-1,8-diol, neopentyl glycol, 1,4-bis(hydroxymethyl)cyclohexane, 2-methylpropane-1,3-diol, glycerol, trimethylolpropane, hexane-1,2,6-triol, butane-1,2,4-triol, trimethylolethane, pentaerythritol, quinitol, mannitol and sorbitol, formitol, methyl glycoside, diethylene glycol, triethylene glycol, tetraethylene glycol and higher polyethylene glycols, dipropylene glycol and higher polypropylene glycols, and dibutylene glycol and higher polybutylene glycols. The polyesters may contain terminal carboxyl groups. Polyesters of lactones (for example, ε-caprolactone) or of hydroxycarboxylic acids (for example, ω-hydroxycaproic acid) may also be used.

It is also possible to use auxiliaries and additives, such as readily volatile inorganic, but preferably organic, substances as blowing agents; catalysts known per se, such as tertiary amines, tin(II) and tin(IV) compounds; surface-active additives, such as emulsifiers and foam stabilizers; reaction retarders, for example acid-reacting substances, such as hydrochloric acid or organic acid halides: cell regulators known per se, such as paraffins, fatty alcohols or dimethyl polysiloxanes; pigments or dyes known per se; stabilizers against the effects of aging, light and weather; plasticizers; fungistatic and bacteriostatic agents; and fillers. These optional auxiliaries and additives are described in detail, for example, in DE-A 2,732,292, pages 21 to 24. Further examples of the auxiliaries and additives are described in Kunststoff-Handbuch, Vol. VII, edited by Vieweg and Höchtlen, Carl-Hanser-Verlag, München 1966, on pages 103 to 113 and in Kunststoff-Handbuch, Vol. VII, edited by Becker and Braun, Carl-Hanser-Verlag, München 1983, on pages 92 to 111.

Rigid foams produced with the polyethers according to the invention are used as insulation boards; as sandwich elements with various surface layers; as in-situ foams, such as spray foams, or foams produced by the overcoating technique; as solar collector fillings; as pipe insulation; and as filling and assembly foams and block foams.

Such foams are produced by continuous or non-continouous processes of the type normally used for polyurethane foams. Suitable processes include, for example, the laminator technique, spraying or casting, using high-pressure or low-pressure foaming machines. The relatively low viscosities of the polyethers of this invention afford advantages, particularly in machine processing.

The present invention, which is set forth in the foregoing disclosure, is not to be construed or limited either in spirit or in scope by these examples. Those skilled in the art will readily understand that known variations of the conditions and processes of the following preparative procedures can be used. In the following examples, all percentages are percentages by weight and all temperatures are degrees Celsius unless otherwise noted.

DESCRIPTION OF THE PREFERRED EMBODIMENTS

Examples 1 to 14 and Comparison Examples a to i:

Preparation of Polyether Polyols.

General procedure

The o-tolylenediamine and a catalyst are introduced with stirring under nitrogen into a reactor suitable for reactions with alkylene oxides, after which ethylene oxide is added at 90 to 125° C. under a nitrogen pressure of 1 to 3 bar. After the reaction has proceeded for 1 to 2 hours, propylene oxide is gradually added at the above temperature, followed by another reaction period lasting approximately 5 hours. Thereafter any traces of free alkylene oxide are removed by distillation under reduced pressure and, after the addition of approx. 0.1% by weight Ionol® (supplied by Shell, Netherlands), the contents of the reactor are drained off.

Fourteen formulations as Examples, the resulting polyether polyols according to the invention, and nine Comparison Examples are compared in Table 1 below. The following abbreviations are used:

| | |
|---|---|
| EO | ethylene oxide in mol/mol o-tolylenediamine |
| PO | propylene oxide in mol/mol o-tolylenediamine |
| Catalysts: | |
| 1 | N-methylimidazole |
| 2 | benzyltrimethylammonium hydroxide in the form of a 40% aqueous or methanolic solution |

-continued

| | |
|---|---|
| 3 | 2-dimethylaminoethanol |
| 4 | 2-dibutylaminoethanol |
| 5 | N,N-dimethylbenzylamine |
| 6 | N,N-dimethylcyclohexylamine |
| 7 | pentamethyl diethylenetriamine |
| 8 | 2,2'-bis(dimethylamino)diethyl ether |
| 9 | N-methyl-N'-(dimethylaminoethyl)-piperazine |
| 10 | potassium hydroxide (KOH) |
| 11 | triethylamine |
| 12 | pyridine |

The quantity in percent by weight of the catalysts shown in the Table is based on the mixture as a whole.

In Comparison Examples a, b, e, f, g and i, the catalyst was added after the ethylene oxide stage.

The polyether polyols catalyzed with potassium hydroxide were neutralized with sulfuric acid upon completion of the post reaction and the salts were filtered off during the workup process.

The OH values shown were determined both by the acetic anhydride ($Ac_2O$) method and also by the phthalic anhydride (PA) method. The difference between the values of both methods represents the content of secondary NH groups.

TABLE 1

| Example | Catalyst | % by weight | Mol EO | Catalyst | % by weight | Mol PO | OH value ($Ac_2O$) | OH value (PA) | η 25° (mPa.s) | o-TDA (% by weight) |
|---|---|---|---|---|---|---|---|---|---|---|
| 1 | 1 | 0.1 | 3.6 | | | 3.4 | 468 | 417 | 7980 | 0.03 |
| a | | | 3.6 | 1 | 0.1 | 3.4 | 469 | 465 | 19200 | 0.002 |
| b | | | 3.6 | 10 | 0.3 | 3.4 | 470 | 467 | 18500 | 0.003 |
| c | 11 | 0.5 | 3.6 | | | 3.4 | 472 | 468 | 43700 | 0.001 |
| d | 10 | 0.3 | 3.6 | | | 3.4 | 437 | 435 | 1770 | 2 |
| 2 | 5 | 0.3 | 4.0 | | | 3.1 | 468 | 420 | 6820 | 0.03 |
| 3 | 2 | 0.2 | 3.6 | | | 3.4 | 471 | 425 | 5400 | 0.03 |
| 4 | 3 | 0.2 | 3.6 | | | 3.4 | 470 | 416 | 5650 | 0.08 |
| e | | | 3.6 | 3 | 0.2 | 3.4 | 468 | 463 | 17820 | 0.002 |
| 5 | 1 | 0.15 | 3.6 | | | 2.6 | 520 | 457 | 9420 | 0.06 |
| f | | | 3.6 | 1 | 0.15 | 2.6 | 520 | 502 | 32890 | 0.01 |
| 6 | 8 | 0.2 | 3.6 | | | 2.6 | 519 | 449 | 5640 | 0.15 |
| 7 | 6 | 0.15 | 3.6 | | | 2.6 | 515 | 466 | 8900 | 0.08 |
| 8 | 1 | 0.1 | 2.0 | | | 3.54 | 540 | 479 | 40500 | 0.01 |
| 9 | 1 | 0.1 | 3.6 | | | 2.33 | 539 | 477 | 11500 | 0.05 |
| g | | | 3.6 | 1 | 0.1 | 2.33 | 538 | 525 | 28860 | 0.005 |
| h | 12 | 0.5 | 3.6 | | | 2.32 | 539 | 520 | 37740 | 0.002 |
| 10 | 3 | 0.3 | 4.0 | | | 2.03 | 540 | 470 | 4500 | 0.15 |
| 11 | 2 | 0.2 | 3.6 | | | 2.33 | 535 | 458 | 5200 | 0.18 |
| 12 | 4 | 0.5 | 3.6 | | | 2.33 | 538 | 451 | 3370 | 0.19 |
| 13 | 7 | 0.2 | 3.6 | | | 2.33 | 535 | 463 | 4300 | 0.18 |
| 14 | 9 | 0.2 | 3.6 | | | 2.33 | 538 | 480 | 8830 | 0.05 |
| i | | | 3.6 | 9 | 0.2 | 2.33 | 537 | 528 | 18750 | 0.002 |

Examples 15 to 19 and Comparison Examples k to n:

Preparation of Foams

Formulations for the production of rigid polyurethane and polyurethane urea foams and rigid foams containing polyisocyanurate structures are shown by way of example in the following Tables using some of the polyols according to the invention. Starting materials:

The isocyanates used were commercially available polyphenyl-polymethylene polyisocyanates obtained by phosgenation of aniline-formaldehyde condensates and having NCO contents of 31% by weight (Desmodur ® 44V20 and Desmodur ® 44V70, products of Bayer AG).

Polyethers according to the invention and conventional polyethers based on o-TDA from Table 1 were used in Examples 15 to 19 and in Comparison Examples k to n, respectively.

EXAMPLE 15

Rigid polyurethane foams were produced from the polyols according to the invention described in Examples 1 to 14 using the following formulation:

| | | |
|---|---|---|
| | 70% | by weight polyol mixture I |
| | 30% | by weight o-TDA-EO-PO polyether |
| | 1.4% | by weight dimethylcyclohexylamine |
| | 40% | by weight R 11 |
| approx. | 150% | by weight Desmodur ® 44V70 |

Polyol mixture I is prepared using the following components:

| | |
|---|---|
| 15% | by weight ethylenediamine-PO-polyether (OH value 630) |
| 9% | by weight glycerol |
| 9% | by weight dimethyl N,N'-bis(hydroxypropyl)-aminomethyl phosphonate |
| 20% | by weight dibromobutanediol-epichlorohydrin polyether (OH value 330; 32% Br, 6.8% Cl) |
| 15% | by weight tris-chloroethyl phosphate |
| 1.4% | by weight stabilizer |
| 0.6% | by weight water |

the rigid polyurethane foams were prepared by thoroughly mixing the o-TDA-EO-PO polyethers according to the invention with polyol mixture I, the activator, and R11. After addition of the isocyanate in the quantity shown, the mixture was stirred for 6 to 12 seconds and then poured into an open mold.

Free-rise foams measuring $30\times30\times30$ $cm^3$ and having a gross density of 25 to 30 $kg/m^3$ were formed. Hardening was determined by a manual method, so that the results can be evaluated only relative to one another.

The fire behavior of the foams was tested in accordance with DIN 4102.

EXAMPLE 16

Foams having a gross density of 42 to 46 $kg/m^3$ were prepared in accordance with Example 15 by reducing the R11 content from around 40 parts by weight to 15 to 17 parts by weight.

The foams were cut up 18 to 24 hours after production and examined for core discoloration (burning) and for cracking. Where the o-TDA-EO-PO polyethers according to the invention were used, no cracking or core discoloration could be found in any of the foams within the gross density range mentioned (Table 2).

TABLE 2

| | A | B | C | D | E | F | G | H | I | K | L | M | N | O |
|---|---|---|---|---|---|---|---|---|---|---|---|---|---|---|
| o-TDA-EO-PO polyether of Example . . . | 1 | 2 | 3 | 4 | 5 | 6 | 7 | 8 | 9 | 10 | 11 | 12 | 13 | 14 |
| Relative Hardening* (as in Example 15) | 1.00 | 0.94 | 1.26 | 1.12 | 1.07 | 0.98 | 1.24 | 0.90 | 0.85 | 1.15 | 0.98 | 0.92 | 0.85 | 0.83 |
| Fire Test (DIN 4102) flame height in mm (as in Example 15) | 133 | 127 | 130 | 138 | 147 | 135 | 133 | 147 | 130 | 140 | 130 | 137 | 125 | 123 |
| Cracking in the 42–46 kg/m$^3$ gross density range (as in Example 16) | no | no | no | no | no | no | no | no | no | no | no | no | no | no |
| Core discoloration in the 42–46 kg/m$^3$ gross density range (as in Example 16) | no | no | no | no | no | no | no | no | no | no | no | no | no | no |

*Depth of penetration of a weighted punch in cm

COMPARISON EXAMPLE k for comparison purposes, foams were produced using the polyols of Comparison Examples a, e, f, g, and i (processing as in Examples 15 and 16). In contrast to foams of the claimed o-TDA-EO-PO polyethers, these foams showed core discoloration and/or cracking.

COMPARISON EXAMPLE l

Foams produced as in Example 16 from o-TDA polyethers catalyzed with metal hydroxides in the propylene oxide stage (polyol of Comparison Example b) show serious core discoloration and cracking.

COMPARISON EXAMPLE m

Comparison Example m shows that not all the amine catalysts used in the ethylene oxide stage lead to the claimed o-TDA polyethers. Where triethylamine or pyridine is used as the catalyst, comparatively high-viscosity o-TDA-EO-PO polyethers are obtained (Comparison Examples c, h). Foams produced from these o-TDA polyethers in accordance with Example 16 show serious core discoloration.

TABLE 3

| | k | | | | | l | m | |
|---|---|---|---|---|---|---|---|---|
| | A | B | C | D | E | F | G | H |
| o-TDA-EO-PO polyether of Comparison Example . . . used in the production of the foam | a | e | f | g | i | b | c | h |
| Relative hardening* (as in Example 15) | 1.57 | 1.06 | 0.92 | 0.85 | 0.75 | 1.14 | 1.07 | 0.90 |
| Fire test (DIN 4102) flame height in mm (as in Example 15) | 127 | 133 | 127 | 140 | 120 | 133 | 127 | 143 |
| Cracking in the 42–46 kg/m$^3$ gross density range (as in Example 16) | yes | yes | yes | yes | no | yes | no | no |
| Core discoloration in the 42–46 kg/m$^3$ gross density range (as in Example 16) | no | no | no | no | yes | yes | yes | yes |

*Depth of penetration of a weighted punch in cm

EXAMPLE 17

The foams produced from the o-TDA-EO-PO polyethers of the invention show improved properties in regard to core discoloration and cracking even when the formulations contain less flame retardant and the foams no longer satisfy the B2 classification.

The polyethers of Examples 1, 12, 14 and 9 were used to represent the claimed o-TDA-EO-PO polyethers and were foamed as in Examples 15 and 16 with inclusion of the added polyols, flame retardants, blowing agents, activators, stabilizers and MDI shown in Table 4.

The foams (gross density range approx. 46 kg/m$^3$) when cut up showed no cracking or core discoloration.

COMPARISON EXAMPLE n

For comparison purposes, foams were produced as in Example 17 using the polyols of Comparison Examples b, a, e, and f. In contrast to those of Example 17, all the comparison foams showed core discoloration. The foams b, a and e also showed cracks in the gross density range indicated.

TABLE 4

| | 17 | | | | n | | | |
|---|---|---|---|---|---|---|---|---|
| | A | B | C | D | E | F | G | H |
| o-TDA-EO-PO polyether of Example . . . | 1 | 12 | 14 | 9 | — | — | — | — |
| o-TDA-EO-PO polyether of | — | — | — | — | b | a | e | f |

TABLE 4-continued

| | 17 | | | | n | | | |
|---|---|---|---|---|---|---|---|---|
| | A | B | C | D | E | F | G | H |
| Comparison Example . . . | | | | | | | | |
| o-TDA-EO-PO polyether | 30 | → | → | → | → | → | → | → |
| Sugar polyether (OH value 420) | 31 | → | → | → | → | → | → | → |
| Crosslinker (OH value 1250) | 12 | → | → | → | → | → | → | → |
| Stabilizer | 1.2 | → | → | → | → | → | → | → |
| Ethylenediamine-PO polyether (OH value 630) | 15 | → | → | → | → | → | → | → |
| Activator | 0.5 | → | → | → | → | → | → | → |
| Water | 0.6 | → | → | → | → | → | → | → |
| Tri-chloroethyl phosphate | 12 | → | → | → | → | → | → | → |
| R11 | 16 | → | → | → | → | → | → | → |
| Desmodur ® 44V70 | 150 | → | → | → | → | → | → | → |
| Cracking in the 46 kg/m$^3$ gross density range | no | no | no | no | yes | yes | yes | no |
| Core discoloration in the 46 kg/m$^3$ gross density range | no | no | no | no | yes | yes | yes | yes |

EXAMPLE 18

Rigid polyurethane foam panels were produced in a known manner in a conventional laminator machine by machine mixing of the components. The foam panels were tested for their fire behavior and their coefficient of thermal conductivity and inspected for core discoloration and cracking.

TABLE 5

| | Formulation | | | | | |
|---|---|---|---|---|---|---|
| | A | B | C | D | E | F |
| Polyol of Example 1 | 30 | — | — | — | — | — |
| Polyol of Example 9 | — | 30 | — | — | — | 30 |
| Polyol of Comparison Example b | — | — | 30 | — | 30 | — |
| Polyol of Comparison Example a | — | — | — | 30 | — | — |
| Polyol mixture I (from Example 15) | 70 | 70 | 70 | 70 | 70 | 70 |
| Dimethylcyclohexylamine | 0.4 | 0.45 | 0.5 | 0.4 | 1.0 | 0.7 |
| R11 | 34 | 34 | 33 | 30 | 36 | 35 |
| Desmodur ® 44V20 | 153 | 158 | 153 | 153 | 150 | 150 |
| Cream time (secs) | 8 | 9 | 9 | 9 | 7 | 7 |
| Gel time (secs) | 45 | 44 | 45 | 45 | 25 | 25 |
| Gross density of panel (kg/m$^3$) | 31 | 31.3 | 29.5 | 29.5 | 35.6 | 36.8 |
| Panel thickness (mm) | 120 | 120 | 120 | 120 | 40 | 40 |
| Compressive strength in foam direction (MPa) | 0.14 | 0.12 | 0.14 | — | 0.18 | 0.22 |
| Coefficient of thermal conductivity (flux method, 24° C.) | 0.018 | 0.018 (30 mm panel cut out) | 0.018 | — | 0.018 | 0.018 |
| Core discoloration | no | no | heavy | moderate | — | — |
| Cracking | no | no | yes | yes | — | — |
| Fire test DIN 4102 | B2 | B2 | B2 | B2 | B2 | B2 |

EXAMPLE 19

The polyols according to the invention may be used for the production of foams containing a higher proportion of isocyanurate structures, for example, in accordance with the following formulation:

1% by weight potassium acetate
1.2% by weight dimethylcyclohexylamine
20% by weight o-TDA-PE (for example, from Example 1)
31% by weight sugar, propylene glycol, water-PO polyether (OH value 470)
13% by weight ethylenediamine-PO polyether (OH value 630)
23.8% by weight Tris-chlorethylphosphate
7% by weight crosslinker (OH value 1230)
3% by weight stabilizer -continued 56% by weight R11
270% by weight Desmodur ® 44V20

| | | |
|---|---|---|
| Reaction times: | stirring time | 10 secs |
| | cream time | 12 secs |
| | gel time | 48 secs |
| Gross density of foam | 29 kg/m$^3$ | |
| Fire test (DIN 4102) | B2 | |
| BVD test (Switzerland) | class V/3 | |

What is claimed is:

1. An o-tolylenediamine-based polyether polyol having an OH number of about 400 to 630, wherein about 5 to 20% of the isocyanate-reactive groups of said polyether polyol are secondary amino groups and said polyether polyol contains less than about 0.2% by weight free o-tolylenediamine, wherein said polyether polyol is formed by a sequential reaction in the presence of an amine catalyst of o-tolylenediamine first with about 2 to 5 mol of ethylene oxide per mol of o-tolylenediamine and then with about 1 to 5 mol of propylene oxide per mol of o-tolylenediamine.

2. A polyether polyol according to claim 1 wherein about 3.1 to 4 mol of ethylene oxide per mol of o-tolylenediamine is used.

3. A polyether polyol according to claim 1 wherein about 1 to 4.1 mol of propylene oxide per mol of o-tolylenediamine is used.

4. A polyether polyol according to claim 1 wherein about 3.1 to 4 mol of ethylene oxide per mol of o-tolylenediamine and about 1 to 4.1 mol of propylene oxide per mol of o-tolylenediamine are used.

5. A process for the production of a polyether polyol according to claim 1 comprising sequentially reacting o-tolylenediamine, at a temperature of about 90° to 125° C. and in the presence of an amine catalyst, with a) about 2 to 5 mol of ethylene oxide per mol of o-tolylenediamine, and then b) about 1 to 5 mol of propylene oxide per mol of o-tolylenediamine, wherein the total amount of ethylene oxide and propylene oxide is about 5.0 to 8.1 mol per mol of o-tolylenediamine.

6. A process according to claim 5 wherein the amine catalyst is a standard commercial amine polyurethane foam catalyst.

7. A process according to claim 5 wherein the catalyst is selected from the group consisting of N-methylimidazole, benzyltrimethylammonium hydroxide, and 2-di($C_1$-$C_4$ alkyl)aminoethanol.

8. A process according to claim 5 wherein the catalyst is selected from the group consisting of N,N-dimethylbenzylamine, N,N-dimethylcyclohexylamine, pentamethyl diethylenetriamine, 2,2'-bis(dimethylamino)-diethyl ether, N-methyl-N'-(dimethylaminoethyl)-piperazine, N-methylimidazole, benzyltrimethylammonium hydroxide, and 2-di($C_1$-$C_4$ alkyl)aminoethanol.

9. A process according to claim 5 wherein about 3.1 to 4 mol of ethylene oxide per mol of o-tolylenediamine and about 1 to 4.1 mol of propylene oxide per mol of o-tolylenediamine are used, wherein the total amount of ethylene oxide and propylene oxide is about 5.0 to 8.1 mol per mol of o-tolylenediamine.

10. A process according to claim 5 for the production of a polyether polyol according to claim 1 comprising sequentially reacting o-tolylenediamine, at a temperature of about 90° to 125° C. and in the presence of an amine catalyst selected from the group consisting of N,N-dimethylbenzylamine, N,N-dimethylcyclohexylamine, pentamethyl diethylenetriamine, 2,2'-bis(dimethylamino)diethyl ether, N methyl-N'-(dimethylaminoethyl)-piperazine, N-methylimidazole, benzyltrimethylammonium hydroxide, and 2-di($C_1$-$C_4$ alkyl)aminoethanol, with a) about 3.1 to 4 mol of ethylene oxide per mol of o-tolylenediamine, and then b) about 1 to 4.1 mol of propylene oxide per mol of o-tolylenediamine, wherein the total amount of ethylene oxide and propylene oxide is about 5.0 to 8.1 mol per mol of o-tolylenediamine.

* * * * *